(12) United States Patent
Chapman

(10) Patent No.: US 10,178,047 B2
(45) Date of Patent: Jan. 8, 2019

(54) SIGNAL ROUTING SYSTEM

(71) Applicant: ZOMOJO PTY LTD, Sydney, New South Wales (AU)

(72) Inventor: Matthew Chapman, Sydney (AU)

(73) Assignee: ZOMOJO PTY LTD, Sydney, New South Wales (AU)

(*) Notice: Subject to any disclaimer, the term of this patent is extended or adjusted under 35 U.S.C. 154(b) by 0 days.

(21) Appl. No.: 15/311,490

(22) PCT Filed: May 26, 2015

(86) PCT No.: PCT/AU2015/000311
§ 371 (c)(1),
(2) Date: Nov. 15, 2016

(87) PCT Pub. No.: WO2015/179895
PCT Pub. Date: Dec. 3, 2015

(65) Prior Publication Data
US 2017/0085422 A1 Mar. 23, 2017

(30) Foreign Application Priority Data
May 26, 2014 (AU) .................... 2014202865

(51) Int. Cl.
*H04L 12/933* (2013.01)
*H04L 12/947* (2013.01)
(Continued)

(52) U.S. Cl.
CPC .......... *H04L 49/101* (2013.01); *H04L 12/413* (2013.01); *H04L 41/083* (2013.01);
(Continued)

(58) Field of Classification Search
CPC ......... H04L 45/00; H04L 45/08; H04L 45/10; H04L 45/14; H04L 45/20; H04L 45/22;
(Continued)

(56) References Cited

U.S. PATENT DOCUMENTS

2005/0025060 A1 2/2005 Fike et al.
2005/0138520 A1 6/2005 Richardson
(Continued)

FOREIGN PATENT DOCUMENTS

AU 2013101670 1/2014
EP 1113619 7/2001
(Continued)

OTHER PUBLICATIONS

International Search Report dated Aug. 28, 2015 in International Application No. PCT/AU2015/000311, filed May 26, 2015.
International Preliminary Report on Patentability dated Sep. 22, 2016 in International Application No. PCT/AU2015/000311, filed May 26, 2015.
(Continued)

*Primary Examiner* — Ashley Shivers
(74) *Attorney, Agent, or Firm* — Knobbe, Martens, Olson & Bear, LLP

(57) ABSTRACT

This specification discloses a protocol agnostic networking apparatus and method of networking. The networking apparatus receives physical layer signal through a plurality of communications ports that interface with external computing systems. A crosspoint switch interconnects the communications ports with discrete reconfigurable data conduits. Each of the data conduits defines a transmission pathway between predetermined communications ports. A management module maintains the data conduits based on configuration commands received from an external computing system. The management module interfaces with the crosspoint switch to make and/or break data conduits responsive to received configuration commands.

19 Claims, 6 Drawing Sheets

(51) Int. Cl.
*H04L 12/413* (2006.01)
*H04L 12/24* (2006.01)
*H04L 12/26* (2006.01)

(52) U.S. Cl.
CPC .......... *H04L 41/0813* (2013.01); *H04L 43/08* (2013.01); *H04L 49/10* (2013.01); *H04L 49/15* (2013.01); *H04L 49/25* (2013.01)

(58) Field of Classification Search
CPC ....... H04L 45/24; H04L 45/123; H04L 45/26; H04L 45/30; H04L 45/304; H04L 45/306; H04L 45/34; H04L 45/38; H04L 45/42; H04L 45/66; H04L 45/72; H04L 45/741; H04L 45/742; H04L 12/54; H04L 49/15; H04L 49/10; H04L 49/101; H04L 49/1576; H04L 49/25
See application file for complete search history.

(56) References Cited

U.S. PATENT DOCUMENTS

2008/0284675 A1* 11/2008 Perkins ................ G06F 3/1446
  345/1.3
2013/0121692 A1 5/2013 Patel
2013/0347103 A1 12/2013 Veteikis et al.

FOREIGN PATENT DOCUMENTS

WO  WO 2013/134810  9/2013
WO  WO 2013/155566  10/2013

OTHER PUBLICATIONS

Extended European Search Report dated Nov. 20, 2017 corresponding to European Application No. EP 15799340.3.

* cited by examiner

SIGNAL ROUTING SYSTEM

FIELD OF THE INVENTION

The disclosure of this specification relates generally to low latency data communications, and more particularly (but not exclusively) to a reconfigurable networking system and a method for low latency networking.

BACKGROUND

Communication latency is a measure of delay between releasing communication transmissions and the transmissions being received. Latency in data communication networks is introduced by physical limitations of the networking equipment (including transmission mediums) and transmission signal processing procedures implemented during sending and receipt. The latency of communications may, in some applications, be an important factor in securing a desired outcome. For example, being the first to have a complete electronic trade order received by a stock exchange can establish trade priority. Advantage can then be taken of favourable prices for financial instruments, such as shares, derivatives and futures. Being the first to receive market information may enable a trader to take advantage of favourable market conditions before others. In another example, the outcome of a networked electronic game for an individual player may be determinant on the latency of gaming commands transmitted across the network. Being able to send a low latency instruction to place a wager or a bid at an auction, for example, may increase the probability of securing good odds, a good price, or a successful purchase.

SUMMARY OF THE INVENTION

In a first aspect, the present invention provides a networking apparatus comprising:
  a plurality of communications ports that interface with external computing systems to channel physical layer signals,
  a crosspoint switch connected to each of the communications ports that routes physical layer signals within the networking apparatus, the crosspoint switch having a plurality of discrete signal channels that are dynamically interconnectable to form data conduits,
  a management module that controls routing of physical layer signals responsive to commands from an external computing system, the management module being interfaced with the crosspoint switch to manipulate data conduits by making and/or breaking connections between signal channels, and
  a processing unit connected in an internal routing loop with the crosspoint switch that decodes internally routed physical layer signals and processes extracted data prior to reversion to a destination communications port, the internal routing loop connecting the processing unit to a plurality of crosspoint switch signal channels.

In an embodiment, the networking apparatus comprises a mounting socket that releasably supports the processing unit, the mounting socket interfacing the processing unit with the internal routing loop.

In an embodiment, the networking apparatus comprises a programmable logic device integrated with the processing unit.

In an embodiment, the networking apparatus comprises a communications interface slot that receives a releasable socket module and interfaces individual port sockets within the socket module with signal channels of the crosspoint switch.

In an embodiment, the networking apparatus comprises a routing controller integrated with the management module that configures the crosspoint switch for multiplexing operations involving a defined set of source communications ports to minimize multiplexing stages within the processing unit.

In an embodiment, the networking apparatus comprises a routing controller that determines a minimum set of logic blocks within the processing unit for multiplexing operations and channels physical layer signals from designated communications ports to input interfaces at the processing unit that correspond to logic blocks within the minimum set to optimize logic block utilization.

In an embodiment, the networking apparatus comprises a switching module that facilitates configuration of individual communications ports via a management interface, the management module interconnecting signal channels within the crosspoint switch to link communications ports responsive to configuration commands received via the switching module.

In an embodiment, the configurations commands supported by the switching module via the management interface include timestamping, link quality monitoring, ingress filtering, quality of service rate limiting, packet counting and port-to-port pass-through routing.

In an embodiment, the networking apparatus comprises a switching module that facilitates protocol classification for individual communication ports routed via the processing unit, the management module using the protocol classification for a communications port to initialize the processing unit to decode signals received via corresponding communications ports and/or encoding signals designated for corresponding communications ports.

In an embodiment, the networking apparatus comprises a plurality of physical layer conduits that interface the processing unit with individual signal channels of the crosspoint switch to form the internal routing loop, each of the physical layer conduits defining a dedicated unidirectional pathway for transmission of physical layer signals between the processing unit and a corresponding signal channel of the crosspoint switch.

In an embodiment, the networking apparatus comprises a plurality of physical layer conduits that interface the processing unit with individual signal channels of the crosspoint switch to form the internal routing loop, the internal routing loop having a forwarding conduit and a return conduit for each of the communications ports.

In an embodiment, the networking apparatus comprises a plurality of physical layer conduits that interface the communications ports with individual signal channels of the crosspoint switch, each of the communications ports having two physical layer conduits that define a loop between the communications port and the crosspoint switch.

In an embodiment, the networking apparatus comprises a plurality of physical layer conduits that interface the processing unit and the communications ports with dedicated signal channels of the crosspoint switch, the management module interconnecting channels within the crosspoint switch to establish a transmission pathway between respective physical layer conduits.

In an embodiment, the networking apparatus comprises an independent management port interfaced with the management module, the management port facilitating reception of configuration commands from an external computing system via a management network.

In an embodiment, the networking apparatus comprises a signal monitoring unit that samples physical layer signals received via designated communications ports at defined offsets from a nominal sample point to evaluate signal quality, and determines whether the physical layer signal can be recovered at the sample points.

In an embodiment, the networking apparatus comprises a plurality of clock and data recovery modules that facilitate signal conditioning, each of the communications ports being associated with a clock and data recovery module.

In an embodiment, the networking apparatus comprises a plurality of AC couplings that connect the crosspoint switch to each of the clock and data recovery modules.

In an embodiment, the networking apparatus comprises a reference clock that is interfaced with each of the clock and data recovery modules.

In a second aspect, the present invention provides a networking method comprising:
  a networking apparatus interconnecting channels of a crosspoint switch to form reconfigurable data conduits responsive to receipt of configuration commands from an external computing system, the data conduits interconnecting a source communications port and a destination communications port in an internal routing loop that includes a processing unit,
  the networking apparatus receiving physical layer signals at the source communications port and routing the received physical layer signals from the source communications port to the processing unit via a forwarding data conduit,
  the networking apparatus causing the processing unit to decode physical layer signals, process data extracted from the physical layer signals and re-encode extracted data using a communications protocol that is compatible with a designated destination communications port, and
  the networking apparatus routing the re-encoded physical layer signals from the processing unit to a designated destination communications port via a return data conduit.

In an embodiment, the method comprises:
  the networking apparatus routing physical layer signals from a plurality of source communications ports to the processing unit via distinct forwarding data conduits,
  the processing unit extracting data from the physical layer signals and multiplexing extracted data received via each of the distinct forwarding data conduits into a multiplexed signal stream, and
  the networking apparatus routing the multiplexed signal stream to a destination communications port via a return data conduit.

In an embodiment, the method comprises the networking apparatus causing the processing unit to decode physical layer signals received via a plurality of source communications ports, extract data frames from the decoded signals, interleave frames received via each of the communications ports in a multiplexed data stream and encode the multiplexed data stream using a communications protocol that is compatible with a destination communications port.

In an embodiment, the method comprises:
  the networking apparatus determining a routing configuration for the crosspoint switch that minimizes multiplexer stages within the processing unit for a defined set of source communications ports, and
  the networking apparatus interconnecting distinct channels within the crosspoint switch to form forwarding data conduits that conform to the determined routing configuration.

In an embodiment, the method comprises:
  the networking apparatus determining a minimum set of logic blocks within the processing unit for multiplexing operations, and
  the networking apparatus interconnecting distinct channels within the crosspoint switch to channel physical layer signals from designated communications ports to input interfaces at the processing unit that correspond to logic blocks within the minimum set to optimize logic block utilization.

In an embodiment, the method comprises the networking apparatus causing the processing unit to timestamp the data extracted from each of the physical layer signals prior to multiplexing the extracted data.

In an embodiment, the method comprises:
  the networking apparatus managing protocol classification for communications ports routed via the processing unit, including receiving protocol classifications for individual communications ports, and
  the networking apparatus using the received protocol classifications to initialize the processing unit for compatibility with a corresponding communications ports to facilitate decoding received signals and/or encoding data for transmission.

In an embodiment, the method comprises the networking apparatus facilitating configuration of individual communications ports, including receiving configuration commands from an external computing system, and reconfiguring the crosspoint switch responsive to the received configuration commands.

In an embodiment, the method comprises the networking apparatus breaking data conduits within the crosspoint switch responsive to received configuration commands to prevent routing of physical layer signals from a source communications port.

In an embodiment, the method comprises the networking apparatus autonomously routing physical layer signals received via a source communications port to the processing unit responsive to receiving a configuration command that specifies multiplexing, timestamping, link quality monitoring, ingress filtering, quality of service rate limiting or packet counting operations.

In an embodiment, the method comprises the networking apparatus receiving a configuration command from an external computing system and establishing a routing loop between communications ports of the networking apparatus responsive to the received configuration command.

In an embodiment, the method comprises the networking apparatus conditioning physical layer signals before routing the signals to a destination communications port.

In an embodiment, the method comprises the networking apparatus performing a clock recovery and signal regeneration process to condition the physical layer signals.

In an embodiment, the method comprises the networking apparatus shaping degraded physical layer signals.

In an embodiment, the method comprises the networking apparatus replicating received physical layer signals and routing the replicated signals to a plurality of destination communications ports.

Any features of the above disclosed systems, methods, network, and module may be combined, if possible.

BRIEF DESCRIPTION OF THE FIGURES

Embodiments of the invention will now be described by way of example only with reference to the accompanying figures, in which.

DETAILED DESCRIPTION

Figure 1:
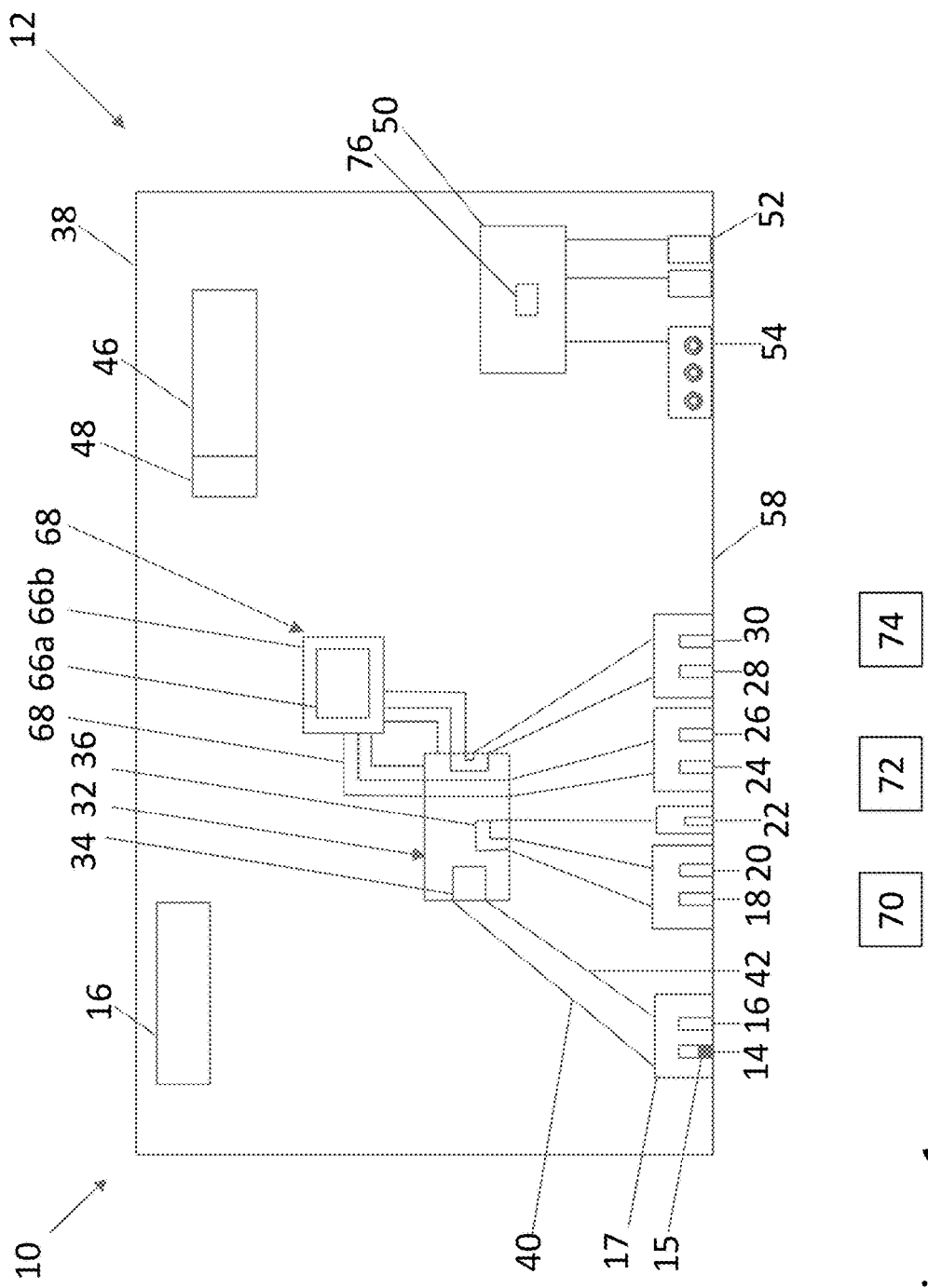
FIG. 1 is a schematic diagram of an embodiment of a networking apparatus illustrating the establishment of a data conduit between communications ports.

Embodiments of a networking apparatus are disclosed in this specification. The disclosed apparatus facilitates communication between network capable computing systems that are connected to the networking apparatus. A collection of communications ports interface the networking apparatus with external computing systems. The communications ports channel physical layer signal from the corresponding computing systems to a crosspoint switch within the networking apparatus. The networking apparatus forms reconfigurable data conduits within the crosspoint switch to interconnect designated communications ports and facilitate the exchange of data between external computing systems. The data conduits define transmission pathways within the networking apparatus for physical layer signals. The networking apparatus is capable of channeling data signals between external computing systems via the data conduits at layer 1 of the Open Systems Interconnection (OSI) model.

The disclosed networking apparatus has an integrated processing unit that is capable of extracting data from physical layer signals received via the communications ports. Physical layer signals received from designated computing systems are channeled to the processing unit for intermediate processing before transmission to a destination computing system. The processing unit decodes internally routed physical layer signals, processes data extracted from the signals and re-encodes the data for a designated communications port. Typical processing operations implemented by the processing unit can include multiplexing data from a plurality of computing systems for transmission to a selected destination, timestamping, link quality monitoring, ingress filtering, quality of service rate limiting and transmission analysis (such as data packet counts).

The networking apparatus routes all physical layer signals received via the communications ports with the crosspoint switch. The crosspoint switch has a series of discrete signal channels that facilitate transmission of physical layer signals. The networking apparatus interconnects designated signal channels to form data conduits. The data conduits channel physical layer signals between the respective input/output interfaces of the crosspoint switch and the components connected to the respective signal channels. The crosspoint switch may use semiconductor switches, optical splitters and/or other components to channel signals.

The networking apparatus controls the crosspoint switch to channel physical layer signals directly between external computing systems and route signals internally via the processing unit. The crosspoint switch creates suitable connections (such as electrical or optical pathways) to facilitate this functionality. The routing configuration of the crosspoint switch is set by configuration commands that are independent of the physical layer signals channeled by the networking apparatus. Channeling physical layer signals via preconfigured data conduits eliminates the decoding process implemented in conventional network switches to extract routing information (typically contained in packet headers). This can produce significant latency reductions (especially for latency sensitive applications such as high speed trading and network gaming). The disclosed networking apparatus is also capable of performing higher level functions by routing physical layer signals via the internal processing unit. An integrated management module facilitates configuration of the networking apparatus (including configuration of the crosspoint switch and optional processing functions) from an external computing system.

The processing unit is connected in an internal routing loop with the crosspoint switch. The routing loop comprises a series of dedicated physical layer conduits that connect individual crosspoint switch interfaces with corresponding I/O interfaces at the processing unit. The networking apparatus routes physical layer signals via the processing unit by forming a reconfigurable data conduit between a source communications port and a corresponding input interface. The processing unit decodes physical layer signals received via the source communications port and processes data extracted from the signals. The crosspoint switch controls routing between communications ports and the processing unit. Physical layer signals from a designated source communications ports are routed to the processing unit via preconfigured forwarding conduits. Re-encoded signals are subsequently routed from the processing unit to a destination communications port via a return conduit.

The networking apparatus can bypass the processing unit for latency sensitive signals that are not designated for internal processing. Pass-through routing between external systems is executed at layer 1 of the Open Systems Interconnection (OSI) model. The networking apparatus facilitates layer 1 routing by establishing a direct data conduit within the crosspoint switch that channels physical layer signals from a source communications port directly to a destination communications port.

The configuration of the signal channels within the crosspoint switch determines the routing path for physical layer signals received by the networking apparatus. This enables the networking apparatus to route signals without processing signal metadata (such as packet headers). The crosspoint switch eliminates routing overheads associated with higher layer signal transmission protocols (such as TCP/IP and UDP) by channeling signals via predefined pathways (instead of determining signal destinations from associated metadata after the signal is received and decoded).

The crosspoint switch is 'data agnostic'. Physical layer signals are channeled within the networking apparatus via predefined data conduits that are not influenced by higher level transmission protocols. This enables the networking apparatus to channel data signals that adhere to different transmission protocols without prejudice. The transmission protocols accompanying internally routed data signals may be used by the processing unit to facilitate internal processing operations (such as packet counting). The processing unit is typically preconfigured for compatibility with a designated protocol to facilitate this functionality.

The disclosed networking apparatus has a plurality of communications ports that facilitate connection with external computing systems. Each of the communications ports incorporate a transceiver module (such as SFP or SFP+) that channels physical layer signals from external computing systems to the crosspoint switch. The networking apparatus may support releasable transceiver modules that can be interchanged to reflect networking requirements (such as swapping electrical transceivers for optical transceivers).

A series of physical layer conduits connect the communications ports with individual channels of the crosspoint switch. The physical layer conduits may interface directly with the transceiver module of a corresponding port or a block interface (such as a socket that receives releasable transceiver modules) that connects to a set of ports.

The illustrated physical layer conduits comprise conductive pathways (such as tracks, signal traces, strip lines and/or micro strip lines and wires) between individual port transceivers and signal channel interfaces at the crosspoint switch. Each of the communications ports is typically linked with two crosspoint switch channels (a 'send' channel and a 'receive' channel) via dedicated physical layer conduits. This facilitates bidirectional signal transmission between the ports and the crosspoint switch.

The crosspoint switch interconnects designated communications ports with discrete reconfigurable data conduits. Each of the data conduits define a transmission pathway between predefined communications ports for physical layer signals. Physical layer signals can be routed directly between communications ports (a 'pass-through' configuration) or channeled via the processing unit. Both configurations enable physical layer signals to be channeled from one computing system to another computing system with low transmission latency relative to conventional network switches that derive routing information from signal metadata.

A management module controls signal routing within the networking apparatus. The management module is interfaced with the crosspoint switch and manipulates data conduits by making and/or breaking connections between signal channels. The routing path for physical layer signals received by the networking apparatus is defined by the configuration of the crosspoint switch (i.e. the data conduits formed by the signal channels).

The management module preconfigures the crosspoint switch and processing unit responsive to configuration commands received from an external computing system. The configuration commands are independent of the physical layer signals being channeled by the networking device. The management module makes and/or breaks data conduits within the crosspoint switch responsive to received configuration commands.

A switching module facilitates configuration of individual communications ports via a management interface. The switching module may be integrated with the management module or implemented as an independent component. The management interface is typically accessible via an independent management network (commonly accessible via the management module). The management module interconnects signal channels within the crosspoint switch to link communications ports responsive to configuration commands received via the management interface.

The processing unit is connected in an internal routing loop with the crosspoint switch. A plurality of physical layer conduits (such as conductive tracks, signal traces, strip lines and/or micro strip lines and wires) convey signals from the crosspoint switch to the processing unit and back from the processing unit to crosspoint switch. Each of the physical layer conduits links an individual channel of the crosspoint switch with a dedicated I/O interface at the processing unit. The crosspoint switch establishes data conduits between designated communications ports and the I/O interfaces to channel physical layer signals via the internal routing loop.

FIG. 1 shows a schematic diagram of an embodiment of a networking device for use in a data network 12. The networking device 10 can be implemented in a variety of networks, including wide area networks such as the internet, an Ethernet network or Infiniband™ network. The illustrated networking device 10 has a plurality of communication ports, generally identified by reference numerals 14 to 30. The communications ports 14 to 30 convey data signals between the networking device 10 and external components (such as external computing systems).

The networking device incorporates a crosspoint switch 32 that channels physical layer signals between the communications ports. Each of the communications ports 14 to 30 is connected to a discrete signal channel within the crosspoint switch. A plurality of dedicated physical layer conduits interface the communications ports 14 to 30 with the respective signal channels. The crosspoint switch 32 establishes connections between individual signal channels to form discrete reconfigurable data conduits. The data conduits interconnect the respective communication ports 14 to 30 to facilitate signal transmissions.

Pass-Through Routing Between Communications Ports

The networking device 10 is capable of routing physical layer signals directly between communications ports via the crosspoint switch 32 in a 'pass-through' routing configuration. The networking device 10 facilitates pass-through routing by linking designated communications ports with discrete data conduits formed between corresponding signal channels within the crosspoint switch 32. The networking device 10 is capable of operating at layer 1 of the Open Systems Interconnection (OSI) model (true physical-layer networking) during pass-through routing.

Pass-through routing is protocol independent ("protocol agnostic"). Physical layer signals are channeled through the crosspoint switch 32 without decoding or interpreting signal metadata. Existing 'physical layer' devices often incorporate higher level signal interpretation (such as retrieving header information from transmitted signals) despite claiming 'physical layer' or 'layer 1' operation. Higher level signal interpretation can require logical operations that introduce latency.

The data conduits formed within the crosspoint switch 32 define a pathway through the networking device 10 for physical layer signals. Physical layer signals are routed from a source communications port to a destination communications port via a corresponding data conduit without processing. The crosspoint switch 32 shown in FIG. 1 is configured to connect ports 14 and 16 in a 'one-to-one' routing configuration with a dedicated data conduit 34. The data conduits formed by the networking device 10 are readily reconfigurable.

The networking device 10 can facilitate both unidirectional and bidirectional data channeling in 'one-to-one' routing configurations. The crosspoint switch 32 may also establish 'one-to-many' port configurations with conduits that interconnect more than two ports. This is facilitated by connecting a 'source' signal channel to multiple 'destination' signal channels within the crosspoint switch. A 'one-to-many' routing configuration is also depicted in FIG. 1. Ports 18, 20 and 22 are interconnected by conduit 36.

'One-to-many' routing configurations are typically used where data distribution equality is important. Physical layer signals from a source communications port are simultaneously channeled to each destination communications port with negligible discrimination. The networking device 10 is restricted to unidirectional data channeling in pass-through 'one-to-many' routing configurations Embodiments of the layer 1 networking device 10 disclosed in this specification are capable of operating over a wide range of bit rates. For example, the networking device 10 may be compatible with any one of 10BASE5 Ethernet bit rate, 10BASET Ethernet bit rate, Fast Ethernet, Gigabit Ethernet, 10 Gigabit Ethernet and 100 Gigabit Ethernet.

The networking device 10 illustrated in FIG. 1 incorporates a management module 50 that facilitates configuration of the crosspoint switch 32. The management module 50 receives configuration commands from an external computing system. The configuration commands define the routing 'state' of the crosspoint switch. The management module 50 makes and/or breaks connections between signal channels within the crosspoint switch responsive to received configuration commands.

Commands that affect routing changes within the networking device 10 can be restricted to an isolated management network. Typical configuration commands define signal channel connections within the crosspoint switch 32 to link designated communications ports and initiate internal routing via the processing unit.

The illustrated management module 50 comprises a control system (such as a microprocessor or dedicated control circuitry) and a communications interface (such as a serial and/or Ethernet interface 52). The control system regulates operation of the networking device 10, including configuration of the crosspoint switch 32. The communications interface connects the management module to an external computing system or network to facilitate service communications (such as diagnostic exchanges and reception of configuration commands).

The management module 50 makes and/or breaks data conduits within the crosspoint switch 32 responsive to configuration commands received from an external computing system. This enables the networking device 10 to be configured without physical interaction. The management module 50 may also control active indicia 54 (such as LED status lights) mounted to the exterior of the enclosure for low level fault detection (such as faults effecting the management module communication interface 52).

Figures 4, 6:
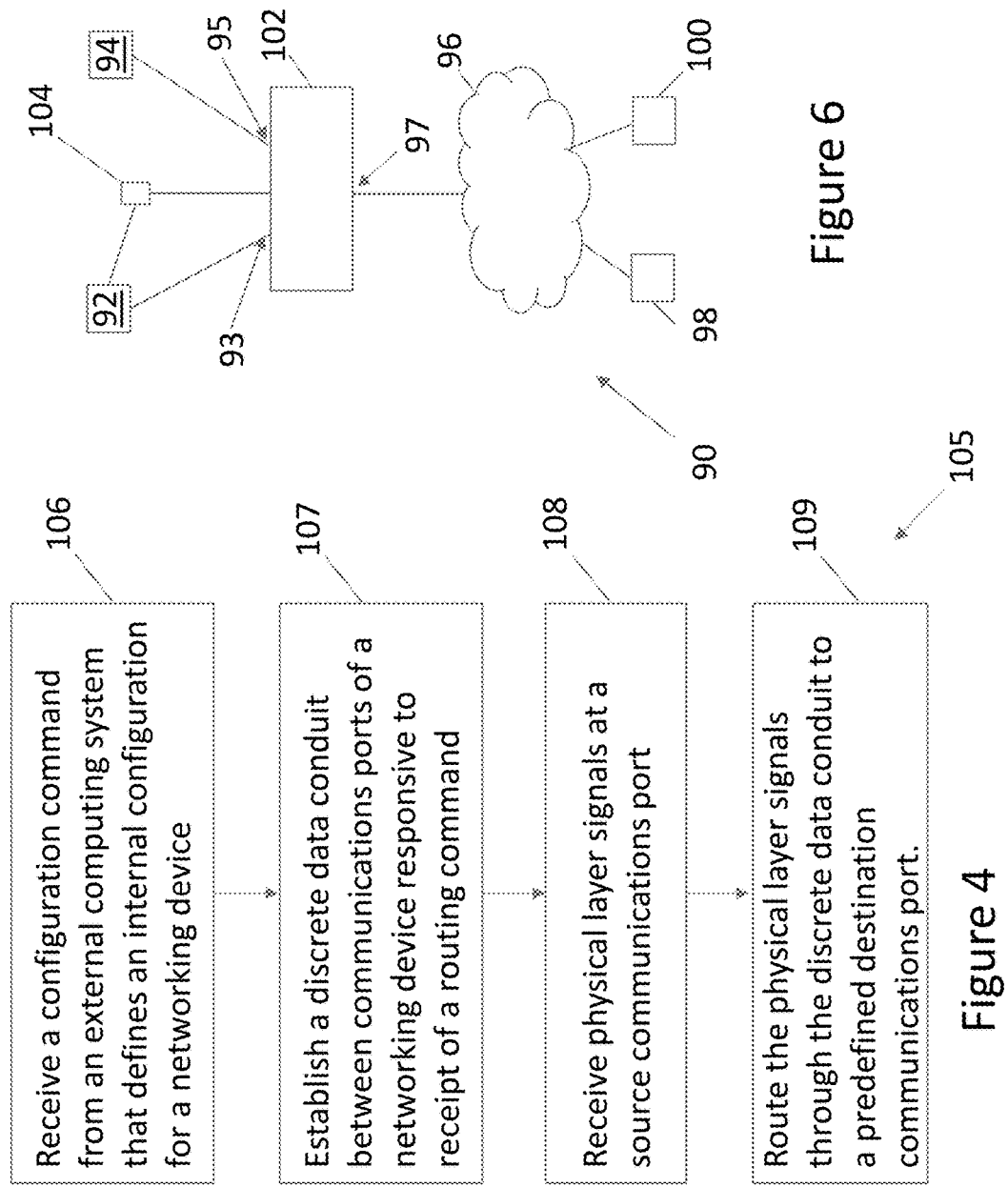
FIG. 4 is a flow diagram of a networking method that the networking apparatus may implement.
FIG. 6 is a schematic representation of a failsafe computing network configuration.

A flow diagram representation of a pass-through networking process is illustrated in FIG. 4. The flow diagram 105 represents a protocol agnostic process for channeling physical layer signals between communications ports. The method illustrated comprises four operations 106, 107, 108, 109. The operations documented in the flow diagram 105 are:
Receiving a configuration command from an external computing system (operation 106). The command is transmitted independently of signals being channeled through the device and may be received by a dedicated communications interface (such as the management module interface 52). The configuration command defines an internal configuration for the networking device.
Establishing a discrete data conduit between communications ports of the networking device responsive to receipt of a configuration command (operation 107). The configuration command may define an internal configuration for the networking device (such as the configuration command identified in operation 106) or cause the networking device 10, 60 to revert to a predefined default configuration (such as an initialization state or a failsafe configuration).
Receiving physical layer signals at a source communications port (operation 108). The networking device 10, 60 is capable of processing signals that adhere to different protocols as the physical layer signals are channeled without extracting transmission information (such as signal headers).
Routing the physical layer signals through the discrete data conduit to a predefined destination communications port. The data conduit linking the source communications port to the destination communications port is established in advance of signal reception as the signal transmission pathway is configured independently of the physical layer signal being channeled.

Operation 106 of the flow diagram (receipt of configuration commands) may be bypassed when the operating configuration of the networking device 10, 60 satisfies the routing configuration needed for scheduled signal transmissions (i.e. no routing changes are required to channel scheduled transmissions). Configuration commands may be transmitted to the networking device 10, 60 to initiate reconfiguration of data conduits. They may also be used to initialize the device (although the networking devices 10, 60 may store preconfigured initialization states).

The networking device 10, 60 may implement other operations that supplement the general networking functionality summarized in FIG. 4. These operations include:
breaking data conduits responsive to received configuration commands to prevent transmission of physical layer signals from a source communications port to a destination communications port.
adding a destination communications port to an established data conduit responsive to a configuration command to expand the distribution of physical layer signals from a source communications port.
distributing a communication received by a service port to a plurality of client ports; and
conditioning a received physical layer signal before routing to a destination.
communications port by performing a clock recovery and signal regeneration process to condition to received physical layer signal and/or shaping the degraded physical layer signal.

Internal Signal Routing and Processing

The networking device 10 depicted in FIG. 1 is also capable of internally processing received signals prior to transmission. A dedicated processing unit 66 facilitates internal processing operations. Typical internal processing operations include multiplexing, timestamping, link quality monitoring, ingress filtering, quality of service rate limiting and transmission analysis (such as data packet counts). The processing unit 66 decodes internally routed physical layer signals and processes data extracted from the signal.

The processing unit 66 is connected in an internal routing loop 68 with the crosspoint switch 32. The illustrated processing unit 66 comprises a processor 66a (commonly an integrated circuit or programmable logic device such as Field Programmable Gate Array) and a complimentary mounting socket 66b that supports the processor 66a. The mounting socket 66b releasably engages the processor 66a, providing a physical layer interface with the crosspoint switch 32 (via the internal routing loop). The illustrated routing loop 66 connects the processing unit 66 in a closed circuit with the crosspoint switch 32 (i.e. the crosspoint switch 32 exclusively interfaces the processing unit 66 with the communications ports). The mounting socket 66b may also interface the processor 66a with the management module 50 and other components (such as a power supply). The processor 66a implements the processes functionality of the processing unit 66 (such as processing data extracted from physical layer signals received from the crosspoint switch 32). The configuration of the illustrated processing unit 66 enables the processor 66a to be removed for diagnostic testing and/or replacement (including general upgrades).

The crosspoint switch 32 routes physical layer signals from designated communications ports to the processing unit 66. Processed signals are routed back from the processing unit 66 to a destination port via the crosspoint switch. The crosspoint switch 32 channels physical layer signals via the internal routing loop 68 by forming data conduits between designated communications ports and selected I/O interfaces at the processing unit 66 (defined by the mounting socket 66b).

A switching module facilitates configuration of individual communications ports via a management interface. The switching module is integrated with the management module 50 depicted in FIG. 1. The management interface is accessible via the management module network interface 52. The management module 50 configures the processing unit 66 for compatibility with designated communications ports responsive to configuration commands received via the management interface.

The switching module facilitates protocol classification for individual communication ports routed via the processing unit 66. The management module 50 uses the protocol classification for each communications port to configure the processing unit 66 for compatibility with the designated communications ports (including initializing the processing unit 66 to decode signals received via corresponding communications ports and/or encode signals designated for corresponding communications ports). The protocol classification may define a networking protocol (such as TCP/IP or UDP) or a transmission protocol (Fast Ethernet, Gigabit Ethernet, 10 Gigabit Ethernet or 100 Gigabit Ethernet). The networking device 10 is capable of exchanging data between non-compatible network nodes through protocol conversion. The processing unit 66 facilitates protocol conversions by extracting data from physical layer signals received from a source network and re-encoding the data with a communications protocol that is compatible with a designated destination network. The networking device 10 may implement this process for incompatible networking protocols and/or transmission protocols.

A series of physical layer conduits interface the crosspoint switch 32 with the processing unit 66. Each of the physical layer conduits connects an individual signal channel within the crosspoint switch to a dedicated I/O interface at the processing unit. A set of 'forwarding' physical layer conduits define transmission pathways between the crosspoint 32 switch and individual input interfaces at the processing unit 66. A set of 'return' physical layer conduits define transmission pathways between output interfaces at the processing unit 66 and individual signal channels within the crosspoint switch 32. The internal routing loop 68 ideally has a forwarding conduit and a return conduit for each of the communications ports to optimize bandwidth (although other configurations are possible).

Individual communications ports are designated for internal processing via commands from an external computing system. The management module 50 configures the crosspoint switch 32 and processing unit 66 responsive to received commands. The commands can define the 'state' of the crosspoint switch 32, prescribe internal processing operations (implemented by the processing unit 66), identify the communications protocol used by the signals (to facilitate defined processing operations) and supply other configuration parameters (such as prioritization ratings for latency sensitive signals). The networking device 10 facilitates independent routing and processing configuration for each of the communications ports. The processing unit 66 decodes internally routed physical layer signals, processes extracted data and encodes the data for transmission to a designated destination communications port. Typical processing operations include multiplexing, timestamping, link quality monitoring, ingress filtering, quality of service rate limiting and packet counting.

The management module 50 is capable of determining an internal routing configuration for the networking device 10 that facilitates the internal processing designated by received configuration commands. This enables the networking apparatus 10 to optimize the interconnection of signal channels (within the crosspoint switch 32) with I/O interfaces (at the processing unit 66) for designated processing operations.

A dedicated routing controller (not shown) integrated with the management module 50 implements a routing optimization algorithm to determine the routing configuration of the crosspoint switch 32 for internal processing. The optimization algorithm is typically derived from the processing capacity of the processor 66a (such as available I/O interfaces and internal processing capabilities) and the interface bandwidth provided by the internal routing loop. The routing controller determines a routing configuration for the crosspoint switch 32 that optimizes utilization of logic blocks within the processing unit for internal processing operations (such as multiplexing). The management module 50 uses the routing configurations determined by the routing controller to channel physical layer signals from designated communications ports to input interfaces at the processing.

Figures 8A, 8B:
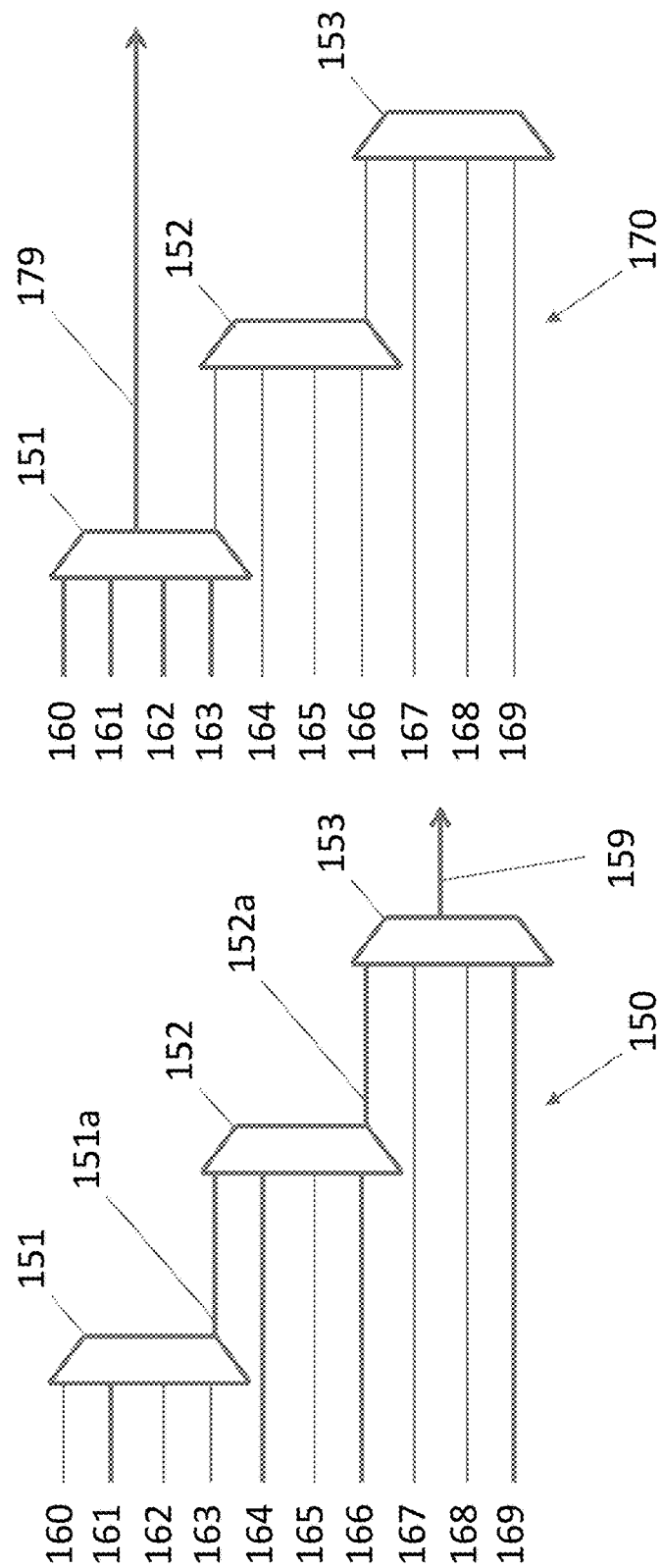
FIG. 8a is a block diagram representing the unstructured signal multiplexing within the processing unit.
FIG. 8b is a block diagram representing optimised signal multiplexing within the processing unit.

A block representation of an unstructured multiplexing operation 150 with four input signals 161, 164, 166, 169 is depicted in FIG. 8a. The depicted operation is implemented in three distinct multiplexing stages (represented by mux blocks 151, 152, 153). Each stage equates to a distinct logic block within the processor 66a. The input channels available for each multiplexing stage are limited by the capacity of logic blocks within the programmable logic device. The illustrated logic blocks (configured as multiplexers 151, 152, 153) each have four signal channel inputs. Service inputs (such as a selector channel) are not depicted.

The programmable logic device represented in FIG. 8a has ten input interface 160 to 169. Each of the input interfaces 160 to 169 is connected to a crosspoint switch by a dedicated physical layer conduit. The crosspoint switch routes physical layer signals to the processing unit via the physical layer conduits. The set of input interfaces used for processing operations is determined by the configuration of the crosspoint switch. The management module 50 routes physical layer signals from individual communications ports to dedicated input interfaces at the processing unit by interconnecting the respective signal channels within the crosspoint switch. The crosspoint switch is configured to route signals to four input interfaces 161, 164, 166, 169 in FIG. 8*a*.

The multiplexing operation 150 depicted in FIG. 8*a* produces a single multiplexed output 159 from four independent input interfaces 161, 164, 166, 169. Physical layer signals from the respective input interfaces 161, 164, 166, 169 are 'combined' over three multiplexing stages (represented by mux blocks 151, 152, 153). The first stage mux block 151 receives physical layer signals from a single input interface 161. The output 151*a* from the first multiplexing stage (mux block 151) is combined with physical layer signals from two independent input interfaces 164, 166 at the second stage mux block 152. The third stage mux block 153 receives the output 152*a* of the second multiplexing stage (mux block 152) and a single input interface 169.

The latency performance of some processing operations can be impacted by the selection of input interfaces used to route physical signals to the processing unit. Each of the multiplexing stages 151, 152, 153 depicted in FIG. 8*a* incurs a latency penalty. The latency of each stage is generally attributable to the inherent processing overhead of the corresponding logic blocks and the transmission of physical layer signals between blocks within the programmable logic device. The overall latency of the illustrated multiplexing operation 150 is a cumulative total of individual latencies at each multiplexing stage 151, 152, 153.

The management module 50 is capable of optimizing the routing configuration of the crosspoint switch to reduce processing latency. An optimized multiplexing operation 170 is depicted in FIG. 8*b*. The illustrated multiplexing operation 170 produces a single multiplexed output 179 from four independent input interfaces 160, 161, 162, 163. The output 179 is derived directly from the first mux block 151.

The crosspoint switch is configured to route physical layer signals from four independent communications ports to the processing unit. The management module 50 establishes a 'forwarding' data conduit within the crosspoint switch for each of the designated communications ports. The forwarding conduits define a transmission pathway from the respective communications ports to a dedicated input interface 160, 161, 162, 163 at the processing unit.

The designated communications ports are interfaced with the first multiplexer stage (mux block 151) via corresponding input interfaces 160, 161, 162, 163 in FIG. 8*b*. This routing configuration eliminates the subsequent multiplexing stages illustrated in FIG. 8*a* (the second 152 and third 153 stage mux blocks are not utilized in the multiplexing operation 170 depicted in FIG. 8*b*) and the corresponding latency attributable to the subsequent stages.

The management module 50 also establishes a 'return' data conduit from the processing unit to a destination communications port for the multiplexed output 179. The return conduit defines a transmission pathway from an output interface at the processing unit to a designated communications port.

The management module 50 uses the routing optimizations generated by the routing controller to organize data conduits within the crosspoint switch and configure the processing unit. The management module 50 may also modify the configuration of the programmable logic device to reduce latency for defined processing operations.

Structural Elements of the Illustrated Networking Device

The illustrated embodiment of the networking device 10 has a multilayer printed circuit board 38. Components are mounted to the circuit board 38 and generally interconnected to each other by physical layer conduits 40 (typically conductive pathways such as tracks, signal traces, strip lines and/or micro strip lines and wires). The illustrated printed circuit board 38 is coupled to various surface mounted and/or through hole components (including the crosspoint switch 32 and mounting socket 66*b*).

Figure 2:
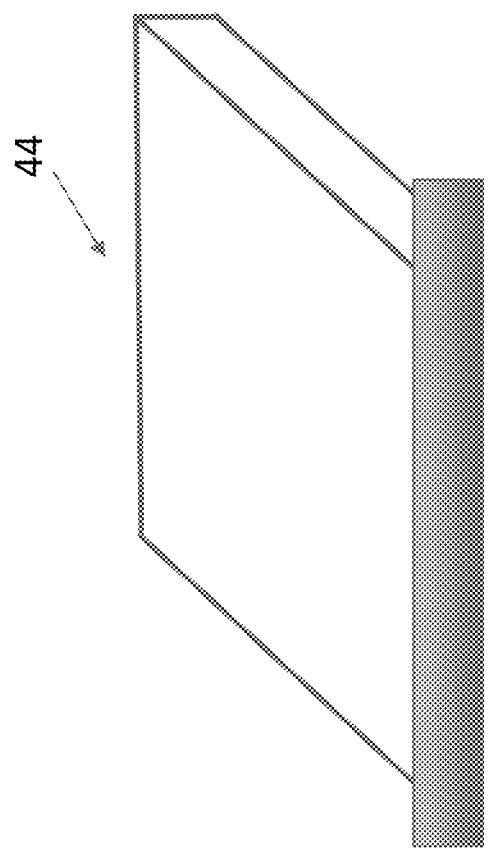
FIG. 2 is a schematic representation of a rack mountable enclosure in which the networking apparatus of FIG. 1 may be housed.

FIG. 2 shows a rack mountable enclosure 44 in which the printed circuit board 38 can be housed (although other housings are possible). The multilayered circuit board 38 illustrated in FIG. 1 is arranged for horizontal disposition within the rack mountable enclosure, which is in turn configured to be horizontally mounted within a rack. This arrangement reduces the amount of rack space used by the networking device.

The illustrated enclosure occupies a single rack slot. The rack mountable enclosure is ideally mounted in either the top position or the bottom position of a rack. Generally, communications cables approach a rack in a data center from one of the top and bottom ends of the rack. Having the enclosure mounted at the end of the rack approached by the communication cables may result in a relatively lower latency.

A power supply 46 is mounted to the printed circuit board 38 in the embodiment illustrated in FIG. 1. The power supply 46 produces a DC operating voltage for the networking device components (typically a relatively low voltage, such as 12, 24 or 48 volts) from an AC source (usually a relatively high voltage associated, such as 110V or 240V mains supply from the electricity grid). A DC regulator 48 (such as a switched mode power supply module) is also mounted to the printed circuit board 38 in the illustrated embodiment. The DC regulator 48 receives the voltage output from the power supply 46 and powers a set of active conductive rails that are integrated with the circuit board 38. The power supply and DC regulator may also be mounted to the enclosure separate from the printed circuit board 38. The networking device 10 may also be powered by the rails of the rack where the device is mounted.

A fan 16 is ideally mounted to the circuit board 38 or the enclosure 44 to regulate the temperature of the networking device components. The fan provides airflow across the multilayer printed circuit board to extract waste heat.

Each of the communication ports 14 to 30 incorporates a network interface, such as a transceiver or dedicated transmitter and receiver modules. A transceiver 15 is illustrated with port 14 in FIG. 1. Suitable transceiver modules include GBIC, XFP, XAUI and Small Form Factor Pluggable Plus (SFP+) transceivers. The transceiver modules may be integrated with the networking device 10 or form part of a interchangeable communications interface (such as releasable optical and/or electrical transceiver blocks). The transceivers are arranged to interface with physical layer conduits that connect the networking device 10 with external computing devices. Typical physical layer conduits include optical fiber network cables and/or electrical network cables (such as copper cabling). The transceivers interface with the physical layer conduits to send and receive electromagnetic communications (such as optical and/or an electrical signals).

The illustrated transceivers are configured to engage two fibre optic LC connectors. This enables the networking device 10 to receive electromagnetic communications through one optical fibre and transmit electromagnetic communications through the other (i.e. the networking device 10 uses each optic fibre for unidirectional communications). The transceivers generate electrical signals from received optical signals and communicate the generated electrical signals to electrical conductors integrated with the printed circuit board 38. The transceivers may support various physical layer standards, such as Ethernet protocol standards SONET, Fibre Channel, or other suitable communications standards.

The illustrated transceivers are grouped and housed in SFP cage enclosures 17 that are fixed to the printed circuit board 38. The enclosures 17, and consequently the communication ports, are disposed adjacent the periphery 58 of the multilayered printed circuit board 38. The cage structure provides an electrical connection between electrical contacts on the transceivers and conductive tracks 40 in (usually stripline and/or micro stripline tracks) formed on or within the circuit board 38. The enclosures 17 may also act as Faraday cages to reduce electromagnetic interference.

The crosspoint switch 32 is interfaced with the communications ports to facilitate exchange of physical layer signals with the corresponding transceivers. Physical layer signals received by the communications ports are transmitted directly to the crosspoint switch 32. The crosspoint switch 32 channels the physical layer signals between communications ports using discrete data conduits that are preconfigured using an independent interface (the management module 50 facilitates configuration of the crosspoint 56 switch in the illustrated embodiment).

The crosspoint switch 56 ideally has some or all of the following attributes:
  non-blocking switching capabilities,
  programmable input equalization, and
  output pre-emphasis settings.

The data conduits established by the crosspoint switch 32 are ideally unregistered and asynchronous so that there are no phase, frequency or signal pattern restriction imposed by the crosspoint switch 32. An example of a suitable crosspoint switch is the VITESSE™ VSC3172 (other crosspoint switches may be used).

The crosspoint switch 32 is capable of channeling physical layer signals to the processing unit 66 prior to transmission to a recipient communications port. The illustrated crosspoint switch 32 and mounting socket 66*b* are connected by a series of conductive pathways (such as tracks, signal traces, strip lines and/or micro strip lines and wires). The conductive pathways transfer physical layer signals between the respective components. The mounting socket 66*b* releasably supports a processor 66*a*, such as a Virtex 5 FPGA from Xilinx.

The networking device 10 establishes discrete data conduits within the crosspoint switch responsive to configuration commands from an external computing device. The configuration commands are independent of the physical layer signals being channeled through the networking device. The data conduits interconnect components within the networking device 10 to channel physical layer signals between external computing systems. The networking device 10 is capable of routing physical layer signals directly between external systems without higher layer processing (such as determining the intended receipt of a data transmission from signal metadata). The signals may be simultaneously routed to a plurality of destinations ports in 'one-to-many' pass-through routing configurations.

A service port 22 is designated for dedicated broadcast applications. The service port 22 receives broadcast communications from a broadcast server. The remaining communication ports 14 to 20 and 24 to 30 are designated for client computing systems that receive communications from the broadcasts server. This configuration is often used to facilitate nondiscriminatory data dissemination from the server to the client computing systems. The crosspoint switch 32 is typically configured in a 'one-to-many' pass-through routing configuration for server broadcasts, so that communications from the server are simultaneously channeled from the service port 22 to each of the 'client' ports. In financial applications, the broadcast server may disseminate price ranges for financial instruments (such as shares, derivatives and futures) and the quantity of instruments sold in a defined time period.

The illustrated service port 22 is disposed adjacent the crosspoint switch 32. It is also centrally disposed with respect to the remaining client communications ports. This configuration can reduce the average latency of communications travelling between the service port and the client ports. For example, embodiments having the service port to one side of all of the client ports may have higher average and maximum latency between the client ports and the service ports. Having the service port as close as possible to the crosspoint switch 32 may result in a relative reduction in latency.

The crosspoint switch 32 illustrated in FIG. 1 is arranged to condition degraded communications that are received by the networking device. Some degree of signal degradation is generally inevitable during high speed communication transmission. Signal degradation increases the probability of data errors. The crosspoint switch 32 shapes the waveform of degraded communications to conform as close as possible with a desired waveform shape (usually comprising a train of square pulses) by adjusting various frequency components of the physical layer signal. The crosspoint switch may also perform a pre-emphasis routine to compensate for expected losses during transmission. Pre-emphasis generally involves overdriving high frequency components of the signal.

Figure 3:
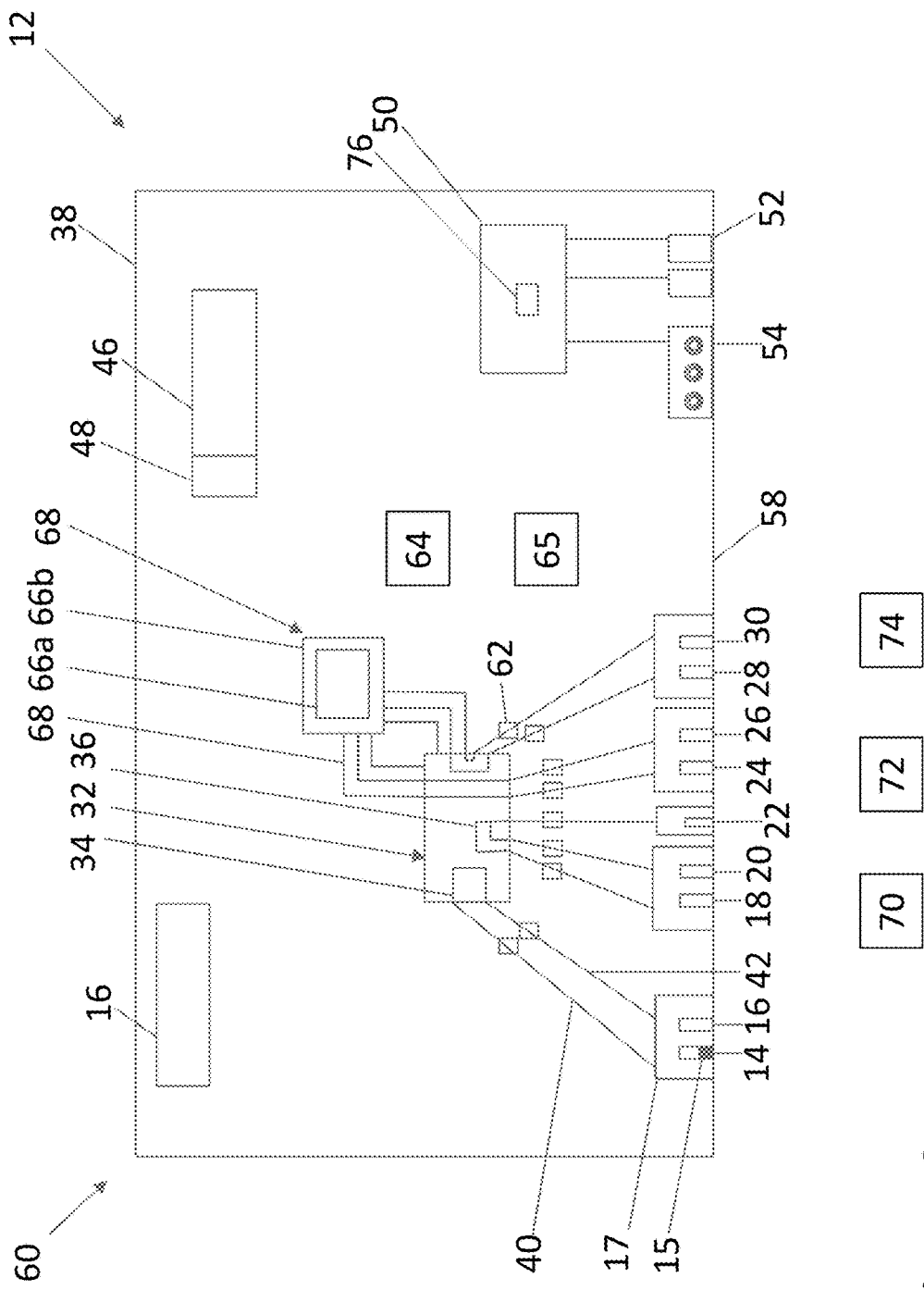
FIG. 3 is a schematic diagram of another embodiment of a networking apparatus that incorporates a plurality of dedicated clock and data recovery (CDR) modules.

Another embodiment of networking device 60 is illustrated schematically in FIG. 3. The networking device 60 retains the fundamental structure and operation of the device 10 illustrated in FIG. 1, Similar reference numerals are used in FIG. 3 to identify components with similar or identical form and/or function to corresponding components identified in FIG. 1.

The networking device 60 illustrated in FIG. 3 incorporates a signal monitoring unit 65 that evaluates the quality of received physical layer signals. A centralized signal monitoring unit 65 is depicted in FIG. 3. The illustrated signal monitoring unit 65 samples physical layer signals received via designated communications ports at defined offsets from a nominal sample point to evaluate signal quality and determines whether received physical layer signals can be recovered at the sample points. This function may also be facilitated with distributed signal monitoring units (not shown) that are disposed on the data path between individual communications ports and the crosspoint switch.

The illustrated networking device 60 also incorporates a plurality of dedicated clock and data recovery (CDR) modules 62. Each of the clock and data recovery (CDR) modules 62 is interfaced to a communication port. The illustrated clock and data recovery (CDR) modules 62 are AC coupled to the crosspoint switch. A reference clock 64 is mounted to the circuit board and interfaced with each of the clock and data recovery modules in the illustrated embodiment. Tracks within the circuit board connect the reference clock 64 with the individual clock and data recovery (CDR) modules 62. The clock and data recovery (CDR) modules 62 often incorporate dedicated signal monitoring units.

The reference clock 64 generates an approximate frequency reference that is transmitted to each of the dedicated clock and data recovery (CDR) modules. The clock and data recovery (CDR) modules 62 generate a clock from the approximate frequency reference and phase align transitions in the signal stream using an internal phase locked loop. The sampling phase is then determined with reference to an eye diagram structure. The clock and data recovery (CDR) modules regenerate degraded signals to reduce jitter and a produce a more open eye relative to the original signal received by the networking device 60.

The networking device 10 may be used to remotely configure and/or reconfigure a data network 12 by sending configuration commands from an external computing system. The networks 12 illustrated in FIGS. 1 and 3 comprise a broadcast server 72 that is interfaced with the service port 22 of the respective networking devices 10, 60. A plurality of client systems 70, 74 are interfaced with client communications ports 18, 30. The service port 22 and the client ports 18, 30 can be remotely linked (by establishing a data conduit between the respective ports) or isolated (by breaking an existing data conduit) from an external computing system by issuing appropriate configuration commands. This allows the dissemination of physical layer signals from the server 72 to the clients 70, 74 to be manipulated from a remote computing system.

Configuration commands that reconfigure the crosspoint switch 32 are typically received and processed by the management module 50. The illustrated management module 50 receives the configuration commands through a dedicated management port 52. These commands may be issued by a remote computing system, allowing the networking device 10, 60 to remain physically isolated.

The ability to remotely configure the networking device 10, 60 is desirable in some applications. For example, a stock exchange may have a secure data center that hosts financial order server(s) and/or client machines participating in an electronic trading network. Physical access to the secure data center is generally restricted during trading hours. Consequently, it can be problematic to reconfigure electronic trading networks that require manual intervention during trading hours. The networking device 10, 60 disclosed in this specification facilitates reconfiguration of the electronic trading network during trading hours by communicating with computing systems on a segregated management network. The management network can often include computing systems located remote of the data center without breaching trading protocols as the management network is isolated from the trading network. The networking device 10, 60 is also advantageous in this exemplary application because it operates at relatively low latency compared to contemporary networking systems. This is particularly desirable in latency sensitive environments.

The networking devices 10, 60 illustrated in FIGS. 1 and 3 incorporates a client controller 76 that monitors client systems for irregularities. The client controller 76 can isolate client systems that exhibit irregularities by breaking the data conduit(s) that interconnect the client system with the network 12. Client irregularities are typically quantified by application specific parameters. The client controller may monitor designated parameters directly or receive updates from a remote system.

The client controller 76 isolates client systems when a monitored client parameter satisfies defined disconnection conditions. Disconnection conditions for financial applications can include pre-order risk conditions, post-order risk conditions and financial ordering system subscription conditions. Breaking data conduits in these situations disconnect the client system from a financial order server. 'On-board' client controllers (such as the client controller illustrated in FIGS. 1 and 3) may be an integrated submodule of the management unit or a separate unit interfaced with the crosspoint switch (either directly or indirectly through the management module).

The client controller can also be implemented by an external computing system (i.e. remote of the printed circuit board and the enclosure 44) that is interface with the management network. External client controllers ideally interface with the management module through the dedicated management port 52. The management module may transmit client information, such as recent client trading behavior and the financial condition of the client, to external client controllers to facilitate remote client monitoring.

Figure 5:
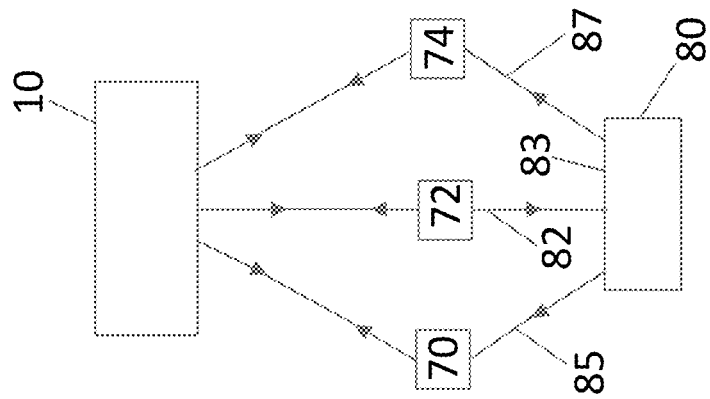
FIG. 5 is a schematic representation of a data replication system.

A data replication system 80 is illustrated in FIG. 5. The replication system can be used in various environments to disseminate information. In financial applications, the replication system can be used in conjunction with a financial ordering system. The illustrated data replication system comprises two networking devices 10, 80 (a primary networking device 10 and a secondary networking device 80). The networking devices 10, 80 are both interfaced with the broadcast port 82 of a financial order server 72. They are also interfaced with a plurality of client systems 70, 74.

The secondary networking device 80 illustrated in FIG. 5 is internally configured to replicate physical layer signals received from the financial order server 72 for dissemination to the client computing systems 70, 74. A 'one-to-many' pass-through configuration is established within the crosspoint switch of the secondary networking device 80 to channel communications from the financial order server 72 ('one') to the client systems 72, 74 ('many'). The primary networking device 10 is configured for 'one-to-one' bidirectional communications between the financial order system 72 and the client computing systems 72, 74.

The replication system 80 illustrated in FIG. 5 is particularly advantageous in latency sensitive applications (such as financial applications where accurate market information is critical).

A failsafe computing network 90 is illustrated in FIG. 6. The computing network 90 comprises a plurality of servers 92, 94 that are interfaced to a common network 96. The network 96 interconnects the servers 92, 94 to a plurality of client machines 98, 100. Typical networks include the internet, local area networks wide area networks.

Generally, the servers 92, 94 are deterministic computing systems that are maintained with the same (or very similar) internal states. An active server 92 services the client systems 98, 100 during regular network operation. The secondary server 94 functions as a 'live backup'. If the active server 92 fails, the backup server 94 is brought 'online' to service the client systems 98, 100 in place of the failed server 92.

The illustrated computing network 90 incorporates a low latency networking device 102 that functions in accordance with the disclosure of this specification. Each of the servers 92 and 94 are interfaced with the networking device 102 through dedicated communications ports 93, 95. A crosspoint switch (integrated with the networking device 102) establishes data conduits that interconnect the server communication ports 93, 95 to the network communication ports 97. The network port 97 is centrally disposed port in the illustrated embodiment, with the server ports 93 and 95 disposed on opposite side. This port allocation minimizes latency for communication channeled from the network to the servers 92, 94 (such as stock orders placed by the client computing systems 98, 100).

A fault detector 104 monitors the active server 92 for faults. The illustrated fault detector 104 is interfaced with the active server 92 and the networking device 102. The fault monitor 104 is arranged to detect server faults and initialize failover to the backup server (typically by issuing a failover command to the networking device 102). The networking device 102 typically responds to failover commands by establishing a data conduit between the backup server port 97 with the network port 97. The networking device 102 may also break the data conduit between failed servers and the networking port 97 to isolate the failed server.

Figure 7:
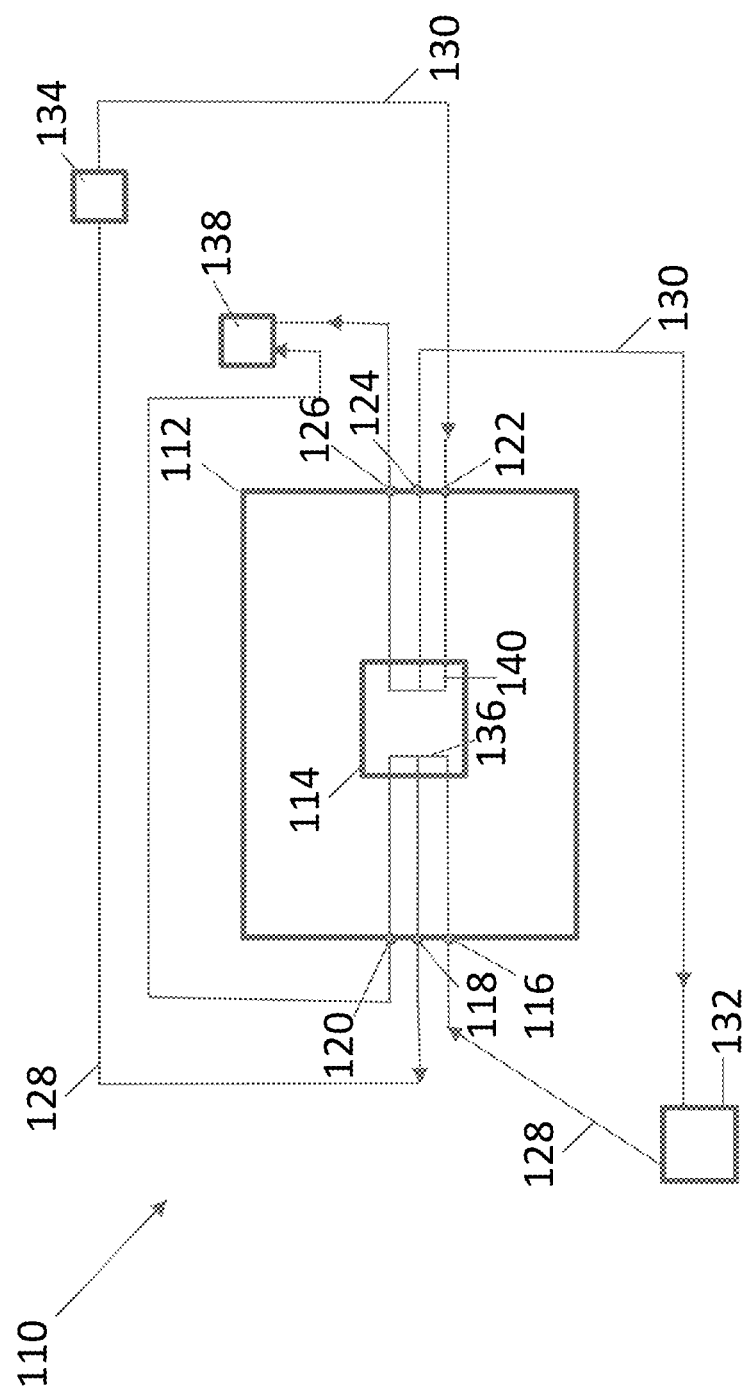
FIG. 7 is a schematic representation of a system for determining latency.

A latency determination system 110 is illustrated in FIG. 7. The system 110 comprises a networking device 112 that operates in accordance with the disclosure of this specification. Communications ports are omitted from the system schematic depicted in FIG. 7 to make the data conduits formed within the crosspoint switch 114 easily distinguishable.

The networking device 112 is disposed into a two-way physical link 128, 130 that interconnects two computing systems 132, 134. The crosspoint switch 114 illustrated in FIG. 7 is configured to replicate data signals received from the computing systems 132, 134 (the incoming signals are received through communications ports 116, 122) and forward the replicated signal to a time stamp module.

Communications sent from the first computing system 132 are replicated by the networking device 112 using a 'one-to-many' routing configuration (represented by data conduit 136). The networking system 112 channels the replicated signals to a time stamp module 138 and the second computing device 134 respectively. The time stamp module generates a time stamp on receipt of the replicated signal.

Receipt of communications signal from the first computing system 132 triggers a response communication from the second computing system 134. The response communication transmitted by the second computing system 134 is similarly replicated and distributed by the networking device 112.

The response signal transmitted by the second computing system 134 is replicated using a 'one-to-many' routing configuration (represented by data conduit 136). The networking system channels the replicated signals to the time stamp module 138 and the first computing system 132 respectively. The time stamp module generates another time stamp on receipt of the replicated response signal. The two time stamps can then be differenced to determine the network latency. Variations and/or modifications may be made to the embodiments described within this specification without departing from the spirit or ambit of the invention. For example, while the networks described above may comprise optical and/or electrical Ethernet (for example 10 Mb, 40 Mb, 1 Gb, 10 Gb, 40 Gb, 100 Gb, 400 Gb, 1 Tb), it will be understood that other network types and protocols may be used, such as INFINIBAND and WiFi. Alternatively or additionally, one or more of the connections may alternatively be a serial port connection, a USB port connection, a FireWire™ port connection, a ThunderBolt™ port connection, a PCI or PCIe connection, a SONET (or SDH) connection with or without a sonet demultiplexing device, or generally any suitable type of connection. The present embodiments are, therefore, to be considered in all respects as illustrative and not restrictive.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A networking apparatus comprising:
    a plurality of communications ports that interface with external computing systems to channel physical layer signals,
    a crosspoint switch connected to each of the communications ports that routes physical layer signals within the networking apparatus, the crosspoint switch having a plurality of discrete signal channels that are dynamically interconnectable to form data conduits,
    a management module that controls routing of physical layer signals responsive to commands from an external computing system, the management module being interfaced with the crosspoint switch to manipulate data conduits by making and/or breaking connections between signal channels, and
    a processing unit connected in an internal routing loop with the crosspoint switch that decodes internally routed physical layer signals from the crosspoint switch and processes data extracted from the physical layer signals prior to reversion to a destination communications port via the crosspoint switch, the internal routing loop connecting the processing unit to a plurality of crosspoint switch signal channels.

2. The networking apparatus of claim 1 comprising a mounting socket that releasably supports the processing unit, the mounting socket interfacing the processing unit with the internal routing loop.

3. The networking apparatus of claim 1 comprising a programmable logic device integrated with the processing unit.

4. The networking apparatus of claim 1 comprising a communications interface slot that receives a releasable socket module and interfaces individual port sockets within the socket module with signal channels of the crosspoint switch.

5. The networking apparatus of claim 1 comprising a routing controller integrated with the management module that configures the crosspoint switch for multiplexing operations involving a defined set of source communications ports to minimize multiplexing stages within the processing unit.

6. The networking apparatus of claim 1 comprising a routing controller that determines a minimum set of logic blocks within the processing unit for multiplexing operations and channels physical layer signals from designated communications ports to input interfaces at the processing unit that correspond to logic blocks within the minimum set to optimize logic block utilization.

7. The networking apparatus of claim 1 comprising a switching module that facilitates configuration of individual communications ports via a management interface, the management module interconnecting signal channels within the crosspoint switch to link communications ports responsive to configuration commands received via the switching module.

8. The networking apparatus of claim 7 wherein the configurations commands supported by the switching module via the management interface include timestamping, link quality monitoring, ingress filtering, quality of service rate limiting, packet counting and port-to-port pass-through routing.

9. The networking apparatus of claim 1 comprising a switching module that facilitates protocol classification for individual communication ports routed via the processing unit, the management module using the protocol classification for a communications port to initialize the processing unit to decode signals received via corresponding communications ports and/or encoding signals designated for corresponding communications ports.

10. The networking apparatus of claim 1 comprising a plurality of physical layer conduits that interface the processing unit with individual signal channels of the crosspoint switch to form the internal routing loop, each of the physical layer conduits defining a dedicated unidirectional pathway for transmission of physical layer signals between the processing unit and a corresponding signal channel of the crosspoint switch.

11. The networking apparatus of claim 1 comprising a plurality of physical layer conduits that interface the processing unit with individual signal channels of the crosspoint switch to form the internal routing loop, the internal routing loop having a forwarding conduit and a return conduit for each of the communications ports.

12. The networking apparatus of claim 1 comprising a plurality of physical layer conduits that interface the processing unit and the communications ports with dedicated signal channels of the crosspoint switch, the management module interconnecting channels within the crosspoint switch to establish a transmission pathway between respective physical layer conduits.

13. The networking apparatus of claim 1 comprising an independent management port interfaced with the management module, the management port facilitating reception of configuration commands from an external computing system via a management network.

14. The networking apparatus of claim 1 comprising a signal monitoring unit that samples physical layer signals received via designated communications ports at defined offsets from a nominal sample point to evaluate signal quality, and determines whether the physical layer signal can be recovered at the sample points.

15. The networking apparatus of claim 1 comprising a plurality of physical layer conduits that interface the communications ports with individual signal channels of the crosspoint switch, each of the communications ports having two physical layer conduits that define a loop between the communications port and the crosspoint switch.

16. A networking method comprising:
a networking apparatus interconnecting channels of a crosspoint switch to form reconfigurable data conduits responsive to receipt of configuration commands from an external computing system, the data conduits interconnecting a source communications port and a destination communications port in an internal routing loop that includes a processing unit, the networking apparatus receiving physical layer signals at the source communications port and routing the received physical layer signals from the source communications port to a crosspoint switch, the processing unit connected in an internal routing loop with the crosspoint switch, the networking apparatus causing the processing unit to decode physical layer signals, process data extracted from the physical layer signals routed to the processing unit from the crosspoint switch and re-encode extracted data using a communications protocol that is compatible with a designated destination communications port, and the networking apparatus routing the re-encoded physical layer signals from the processing unit to a designated destination communications port via the crosspoint switch.

17. The method of claim 16 comprising:

the networking apparatus routing physical layer signals from a plurality of source communications ports to the processing unit via distinct forwarding data conduits, the processing unit extracting data from the physical layer signals and multiplexing extracted data received via each of the distinct forwarding data conduits into a multiplexed signal stream, and the networking apparatus routing the multiplexed signal stream to a destination communications port via a return data conduit.

18. The method of claim 17 comprising:

the networking apparatus determining a routing configuration for the crosspoint switch that minimizes multiplexer stages within the processing unit for a defined set of source communications ports, and the networking apparatus interconnecting distinct channels within the crosspoint switch to form forwarding data conduits that conform to the determined routing configuration.

19. The method of claim 16 comprising the networking apparatus causing the processing unit to decode physical layer signals received via a plurality of source communications ports, extract data frames from the decoded signals, interleave frames received via each of the communications ports in a multiplexed data stream and encode the multiplexed data stream using a communications protocol that is compatible with a destination communications port.

* * * * *